US012578018B2

(12) United States Patent
Suzuki

(10) Patent No.: US 12,578,018 B2
(45) Date of Patent: Mar. 17, 2026

(54) STEERING DUST SEAL AND SEALING DEVICE

(71) Applicant: NOK CORPORATION, Tokyo (JP)

(72) Inventor: Atsushi Suzuki, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/695,176

(22) PCT Filed: Oct. 25, 2022

(86) PCT No.: PCT/JP2022/039717
§ 371 (c)(1),
(2) Date: Mar. 25, 2024

(87) PCT Pub. No.: WO2023/074679
PCT Pub. Date: May 4, 2023

(65) Prior Publication Data
US 2024/0392878 A1 Nov. 28, 2024

(30) Foreign Application Priority Data
Oct. 26, 2021 (JP) ................................. 2021-174664

(51) Int. Cl.
*F16J 15/3224* (2016.01)
(52) U.S. Cl.
CPC ............................... *F16J 15/3224* (2013.01)
(58) Field of Classification Search
CPC .... F16J 15/3224; B60R 13/0846; B62D 1/16;
F16C 2326/24
(Continued)

(56) References Cited

U.S. PATENT DOCUMENTS 4,504,067 A * 3/1985 Cather, Jr. ............. F16J 15/322
277/575
5,577,741 A * 11/1996 Sink ..................... F16J 15/3252
277/565
(Continued)

FOREIGN PATENT DOCUMENTS

EP 3 147 544 3/2017
JP 60-227064 11/1985
(Continued)

OTHER PUBLICATIONS

International Search Report issued in International Patent Application No. PCT/JP2022/039717, dated Dec. 13, 2022.
(Continued)

*Primary Examiner* — Nicholas L Foster
(74) *Attorney, Agent, or Firm* — GREENBLUM & BERNSTEIN, P.L.C.

(57) ABSTRACT

The disclosure provides a steering dust seal which seals a gap between a shaft hole of a column hole provided in a dashboard and a steering shaft. The steering dust seal includes an annular mounting portion attached to an inner peripheral surface of the shaft hole, an annular bumper facing the steering shaft in a non-contact state, a bellows connecting the mounting portion and the bumper, and a seal lip extending from the bumper to contact with the steering shaft. A lip included in the seal lip is covered over its entire circumference with a resin-made sliding portion having a friction coefficient preventing abnormal noise from occurring due to a stick-slip phenomenon between the rotating steering shaft and the sliding portion.

3 Claims, 2 Drawing Sheets

(58) Field of Classification Search
USPC .......................................................... 277/569
See application file for complete search history.

(56) References Cited

U.S. PATENT DOCUMENTS

| | | | | |
|---|---|---|---|---|
| 7,419,165 | B2* | 9/2008 | Toth | F16J 15/3264 |
| | | | | 277/569 |
| 7,641,561 | B2* | 1/2010 | Moriyama | B62D 1/16 |
| | | | | 280/780 |
| 7,677,577 | B2* | 3/2010 | Kanzaki | F16J 15/3284 |
| | | | | 464/170 |
| 9,062,773 | B2* | 6/2015 | Sedlar | F16J 15/3244 |
| 10,119,617 | B2* | 11/2018 | Kobayashi | F16J 15/3224 |
| 10,208,861 | B2 | 2/2019 | Hamamoto et al. | |
| 10,234,037 | B2* | 3/2019 | Kobayashi | F16J 15/54 |
| 11,603,932 | B2* | 3/2023 | Suzuki | F16J 15/3224 |
| 2005/0250586 | A1* | 11/2005 | Yamada | F16J 15/3224 |
| | | | | 464/170 |
| 2008/0203673 | A1* | 8/2008 | Kanzaki | F16J 15/3284 |
| | | | | 277/402 |
| 2008/0231003 | A1* | 9/2008 | Moriyama | F16J 3/041 |
| | | | | 277/636 |
| 2010/0133758 | A1 | 6/2010 | Kanzaki et al. | |
| 2017/0122438 | A1 | 5/2017 | Hamamoto et al. | |
| 2017/0219100 | A1* | 8/2017 | Kobayashi | F16J 15/3204 |
| 2017/0234434 | A1* | 8/2017 | Shuto | F16J 15/36 |
| | | | | 277/504 |
| 2021/0131561 | A1 | 5/2021 | Suzuki | |

FOREIGN PATENT DOCUMENTS

| | | |
|---|---|---|
| JP | 9-112706 | 5/1997 |
| JP | 9-159031 | 6/1997 |
| JP | 10-217982 | 8/1998 |
| JP | 2585626 | 9/1998 |
| JP | 2000-52360 | 2/2000 |
| JP | 2008-32208 | 2/2008 |
| JP | 2010-216607 | 9/2010 |
| JP | 3204289 | 5/2016 |
| WO | 2006/009230 | 1/2006 |
| WO | 2020/021934 | 1/2020 |

OTHER PUBLICATIONS

Written Opinion issued in International Patent Application No. PCT/JP2022/039717, dated Dec. 13, 2022.

Japan, Decision of Refusal received in Japanese Patent Application No. 2023-556458, dated Apr. 2, 2025, and English language translation thereof.

Extended European Search Report issued in EP Application No. 22887005.1, dated Sep. 19, 2025.

* cited by examiner

STEERING DUST SEAL AND SEALING DEVICE

TECHNICAL FIELD

The present disclosure relates to a steering dust seal and a sealing device.

BACKGROUND ART

As one of sealing devices, there is known a steering dust seal which covers the outer peripheral surface of a steering shaft penetrating between a vehicle interior and an engine room of a vehicle. The steering dust seal prevents rain, wind, dust, and noise from entering the vehicle interior from the engine room.

Refer to FIGS. 1(a) and 1(b) of Japanese Patent Application Laid-Open No. Hei 10 (1998)-217982 (Patent Document 1). A steering shaft (13) penetrates a dust cover (21) provided on a dashboard (3) which separates an engine room and a vehicle interior. A steering dust seal is provided which seals the penetrating part of the steering shaft. In Patent Document 1, a dust cover (21) having a structure in which a metal support cylinder (23) is provided with a bush (24) is used as a steering dust seal. On the other hand, a steering dust seal having a seal lip molded of a rubber elastic material is also widely used as seen in Patent Documents 2 to 4, for example.

A steering dust seal described in Japanese Patent Application Laid-Open No. Hei 09 (1997)-159031 (Patent Document 2) is entirely formed of a rubber-like elastic material. The steering dust seal has a structure in which a bumper (3) is provided via a flexible portion (2) bent in an S shape to an outer periphery mounting portion (1) fixed to a column hole on the dashboard side, and a seal lip (4) is integrally molded on one end side in the axial direction of the bumper (3). A seal lip is in close contact with a shaft (5) being a steering shaft to prevent muddy water or the like from entering into a vehicle interior (refer to paragraphs [0012]-[0013] of Document 2).

A steering dust seal described in Japanese Patent Application Laid-Open No. 2008-032208 (Patent Document 3) is common to one in Patent Document 2 in terms of a basic structure in which an outer periphery mounting portion and a bumper are connected via a flexible portion, and a seal lip is provided on one end side of the bumper in the axial direction. The steering dust seal of Patent Document 3 is different from that of Patent Document 2 in that the flexible portion (15, 25), the bumper (bumper portion 16, 26), and the seal lip (17, 27) are provided in duplicated by being shifted in the axial direction (refer to paragraph and FIGS. 1 to 3 in Patent Document 3).

A steering dust seal described in International Publication No. 2020/021934 (Patent Document 4) is also common to one in Patent Document 2 in that it is constituted of a mounting portion (6) on the outer peripheral side, a bellows (10) corresponding to a bent portion, an inner periphery side annular portion (8) corresponding to a bumper, and a seal lip (12, 14, 16).

PRIOR ART DOCUMENTS

Patent Documents

Patent Document 1: Japanese Patent Application Laid-Open No. Hei 10 (1998)-217982

Patent Document 2: Japanese Patent Application Laid-Open No. Hei 09 (1997)-159031

Patent Document 3: Japanese Patent Application Laid-Open No. 2008-032208

Patent Document 4: International Publication No. 2020/021934

SUMMARY

Problem to be Solved

Eccentricity occurs in the steering shaft. Therefore, in the steering dust seal, a stick-slip phenomenon occurs in a contact portion with the steering shaft, and abnormal noise called "squealing" may occur.

The steering dust seals described in Patent Documents 2 to 4 propose to provide a resin-made sliding member on the inner peripheral side facing the steering shaft in order to solve this problem of squealing. Patent Document 2 discloses "annular low friction sliding material 8 formed of Teflon (refer to paragraph in Patent Document 2)", Patent Document 3 discloses sliding members 20 and 30 "annularly-formed by a predetermined resin" (refer to paragraph in Patent Document 3), and Patent Document 4 discloses a sliding member 26 formed of "a resin with a low friction coefficient harder than an elastomer, like polytetrafluoroethylene" (refer to paragraph in Patent Document 4). Incidentally, "Teflon" described in paragraph in Patent Document 2 is a registered trademark.

In Patent Documents 2 to 4, any of the resin-made sliding members is provided on the inner peripheral surface of the bumper. These sliding members block the contact between the eccentric steering shaft and the rubber material and prevent squealing due to the stick-slip phenomenon.

However, in view of the structure of the steering dust seal which requires a function to seal dust even under an excessively eccentric environment, a local load (stress) is likely to occur in the seal lip which receives the sliding of the steering shaft. Therefore, the seal lip is unevenly worn, and the squeaking described above is generated.

In particular, since the steering dust seal is partly exposed in the vehicle interior, unpleasant abnormal noise like squealing is likely to reach the ears of an occupant. Radical improvements are desired.

The problem of the present disclosure is to prevent the generation of abnormal noise from a steering dust seal.

Means for Solving the Problem

One aspect of a steering dust seal which seals a gap between a shaft hole of a column hole provided in a dashboard separating an engine room and a vehicle interior, and a steering shaft includes an annular mounting portion attached to an inner peripheral surface of the shaft hole, an annular bumper arranged radially inside the mounting portion to face the steering shaft in a non-contact state, a bellows connecting the mounting portion and the bumper, a seal lip extending from the bumper in an axial direction of the shaft hole to bring a lip into contact with the steering shaft, and a resin-made sliding portion covering an entire circumference of the lip brought into contact with the steering shaft.

One aspect of a sealing device which seals a gap between a shaft hole and a shaft includes an annular mounting portion attached to an inner peripheral surface of the shaft hole, an annular bumper arranged radially inside the mounting portion to face the shaft while leaving a gap, a bellows connecting the mounting portion and the bumper, a seal lip extending from the bumper in an axial direction of the shaft hole to bring a lip into contact with the shaft, and a resin-made sliding portion covering an entire circumference of the lip brought into contact with the shaft.

Effects

It is possible to prevent the generation of abnormal noise from a steering dust seal.

DESCRIPTION OF EMBODIMENTS

Embodiments will be described with reference to the drawings. Items to be described are as follows:

1. Configuration
   (1) Arrangement of steering dust seal
   (2) Overview configuration of steering dust seal
   (3) First seal
   (4) Second seal
   (5) Sliding part
2. Actions and effects
3. Modifications

1. CONFIGURATION (1) Arrangement of Steering Dust Seal

Figure 1:
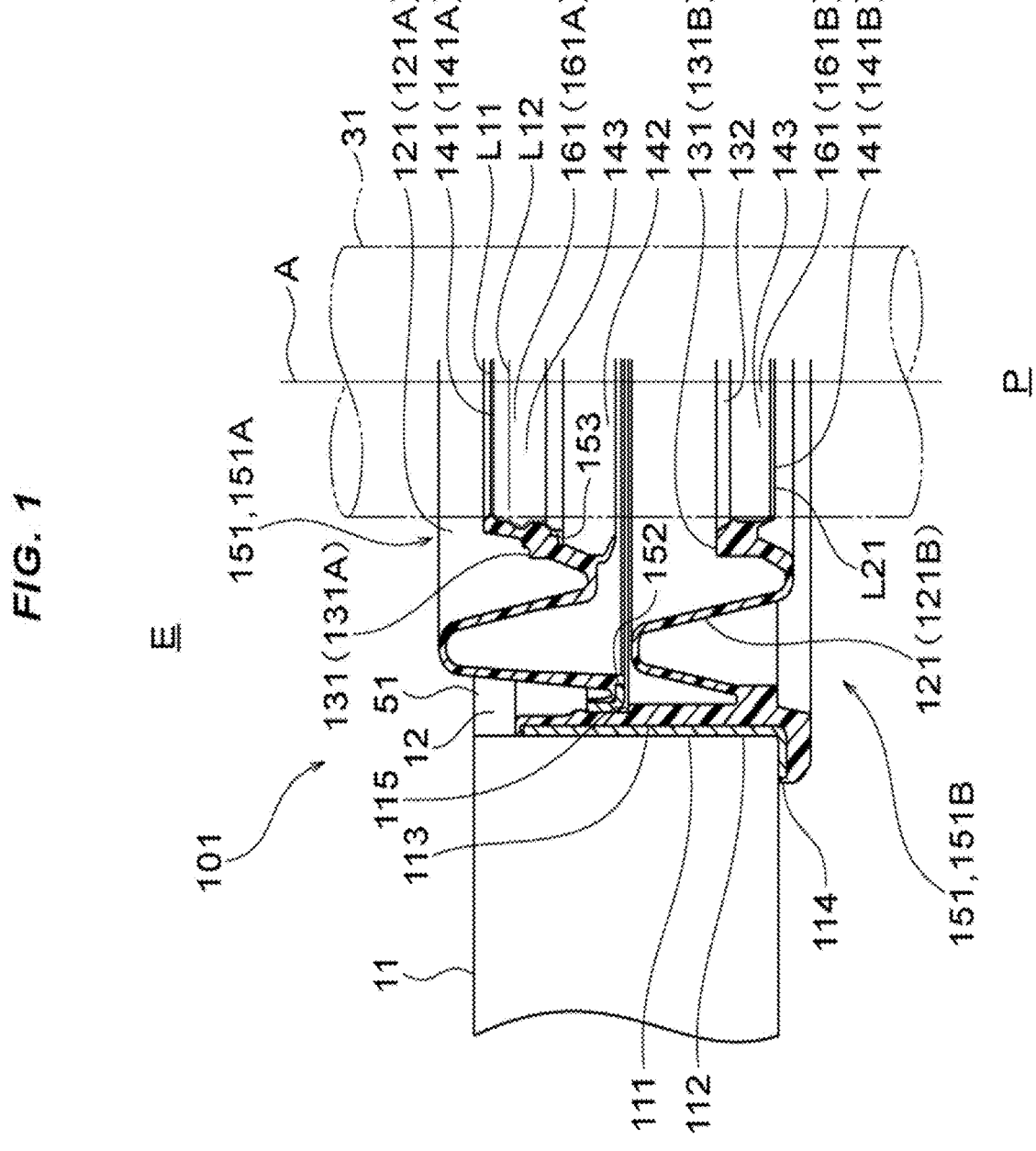
FIG. 1 is a cross-sectional view illustrating an embodiment of a steering dust seal (sealing device)

As illustrated in FIG. 1, the present embodiment is an example of application to a steering dust seal 101 (hereinafter abbreviated as "dust seal 101") as a sealing device used in a vehicle such as a car. The dust seal 101 seals a gap 51 between a column hole 12 provided in a dashboard 11 which separates an engine room E and a vehicle interior P and a steering shaft 31 (hereinafter abbreviated as "shaft 31"). The role of the dust seal 101 is to prevent wind, rain, dust, and noise from entering the vehicle interior P from the engine room E.

In FIG. 1, the shaft 31 is indicated by a two-dot chain line. The shaft 31 is arranged so as to pass through an axis A (indicated by a dashed line in FIG. 1) of the column hole 12. The dust seal 101 is also attached to the column hole 12 with its center aligned with the axis A.

Therefore, the column hole 12, the shaft 31, and the dust seal 101 share a common axis. In the present specification, the "axis A" means the axis of the column hole 12, shaft 31, or dust seal 101, and the term "axial direction" means the axial direction of the axis A. However, the shaft 31 makes the axis A eccentric according to the operation of the vehicle or the like. The dust seal 101 is configured to be able to seal the gap 51 between the column hole 12 and the shaft 31 even if eccentricity occurs in the axis A of the shaft 31.

(2) Overview Configuration of Steering Dust Seal

The dust seal 101 has an annular shape as a whole and allows the shaft 31 to pass through on the inner peripheral side thereof. An annular mounting portion 111 attached to the inner peripheral surface of the column hole 12 is located at the outermost periphery of the dust seal 101. The dust seal 101 has a pair of seals 151 each provided with a bellows 121, a bumper 131, and a seal lip 141 radially inward of the mounting portion 111, which is arranged along the axial direction.

For convenience of description, one of the pair of seals 151 is called a first seal 151A, and the other one is called a second seal 151B. The first seal 151A is arranged on the engine room E side, and the second seal 151B is arranged on the vehicle interior P side.

The mounting portion 111 is an annular structure in which an elastic ring 113 made of a rubber elastic material is adhered (for example, adhered by vulcanization) to the inner peripheral side of a metal ring 112. More specifically, one end of the metal ring 112 is bent at right angles to form a flange 114, and the elastic material forming the elastic ring 113 wraps around to an outer end surface of the flange 114. The outer diameter dimension of the metal ring 112 is slightly larger than that of the column hole 12 so that the metal ring 112 can be press-fitted into the column hole 12. The dust seal 101 can be attached by press-fitting the metal ring 112 into the column hole 12. At this time, the flange 114 abuts against the dashboard 11 and serves as a coming-off preventing function.

(3) First Seal

The first seal 151A has an outer ring 152 which reinforces a bellows 121A and an inner ring 153 which reinforces a bumper 131A. The first seal 151A is a structure in which the bellows 121A, the bumper 131A, and a seal lip 141A are integrally formed from a rubber elastic material. The outer ring 152 and the inner ring 153 are metal annular members. These outer ring 152 and inner ring 153 and the elastic material are integrated by vulcanization adhesion, for example.

The bellows 121A is bent into an S-shaped cross section and connects the outer ring 152 and the bumper 131A.

The bumper 131A has an inner diameter dimension larger than the outer diameter of the shaft 31 and faces the shaft 31 in a non-contact state.

The seal lip 141A is provided so as to extend from the bumper 131A to the engine room E along the axial direction. The seal lip 141A is provided with two lips L11 and L12 which are axially displaced in position. These lips L11 and L12 are arranged on the inner periphery of the seal lip 141A and brought into contact with the outer peripheral surface of the shaft 31 to seal the shaft 31.

The first seal 151A also has an auxiliary lip 142 positioned closer to the vehicle interior P than the bumper 131A. The auxiliary lip 142 has an inner diameter dimension larger than the inner diameter of the bumper 131A. When the shaft 31 is greatly eccentric, the auxiliary lip 142 contacts the outer peripheral surface of the shaft 31.

The first seal 151A configured as described above is press-fitted into the inner peripheral surface of the mounting portion 111 and fixed. It is the outer ring 152 that defines the maximum diameter of the first seal 151A. The outer ring 152 is formed to have a larger diameter than the inner peripheral surface of the elastic ring 113 provided on the inner peripheral side of the mounting portion 111. When the outer ring 152 is inserted into the mounting portion 111, it elastically deforms the elastic ring 113. Thus, the first seal 151A is fixedly attached to the mounting portion 111.

The first seal 151A is attached to the mounting portion 111 by being press-fitted from the direction that will be the engine room E side. The elastic ring 113 is formed to have a larger inner diameter on the side of the engine room E than the inner diameter on the side of the vehicle interior P, and forms a step 115 in the central portion in the axial direction.

The step 115 restricts axial movement of the first seal 151A press-fitted into the mounting portion 111 and positions the first seal 151A.

(4) Second Seal

The second seal 151B is a structure formed integrally with the elastic ring 113 provided on the inner peripheral side of the mounting portion 111. As with the first seal 151A, the second seal 151B also has a bellows 121B, a bumper 131B and a seal lip 141B integrally formed from a rubber elastic material.

The bellows 121B extends from the elastic ring 113 toward the engine room E in the vicinity of the end on the flange 114 side, bends into an S-shaped cross section, and connects to the bumper 131B. The bellows 121B connects the elastic ring 113 of the mounting portion 111 and the bumper 131B to each other.

The bumper 131B has an inner diameter dimension larger than the outer diameter of the shaft 31 and faces the shaft 31 in a non-contact state.

The seal lip 141B is provided so as to extend from the bumper 131B toward the vehicle interior P along the axial direction. The seal lip 141B has a lip L21 at its tip, which contacts the outer peripheral surface of the shaft 31 and seals the shaft 31.

(5) Sliding Portion

In the dust seal 101 of the present embodiment, the seal lip 141 is provided with a sliding portion 161 made of resin. The sliding portion 161 is a ring-shaped slider using a resin having a thickness of about 1 mm, e.g., polytetrafluoroethylene (PTFE) as a material. As an example, the sliding portion 161 is insert-molded on the seal lip 141.

The seal lip 141 allows each of the lips L11, L12, and L21 to contact the outer peripheral surface of the shaft 31 for sealing. At this time, depending on the degree of tension or the eccentricity of the shaft 31, and the like, even the peripheral regions of the lips L11-L12 and L21 may be brought into contact with the shaft 31. In the present specification, the region that can thus contact the shaft 31 is referred to as a contact surface 143 of the seal lip 141. The sliding portion 161 is provided on the entire surface of the contact surface 143 over the entire circumference of the seal lip 141.

For convenience of description, the sliding portion 161 provided on the first seal 151A is referred to as a sliding portion 161A. The sliding portion 161A extends from the lip L11 at the end of the seal lip 141A to the inner ring 153 of the bumper 131A beyond the region of the contact surface 143 of the seal lip 141A.

For convenience of description, the sliding portion 161 provided on the second seal 151B is referred to as a sliding portion 161B. The seal lip 141B extends in parallel with the axis A from the termination of an end surface 132 of the bumper 131B whose inner diameter dimension gradually decreases toward the vehicle interior P, and forms the lip L21 at the end thereof. The sliding portion 161B is provided on the entire surface of the contact surface 143 from the region parallel to the axis A connecting to the end surface 132 of the bumper 131B to the lip L21.

The contact surface 143 will be described.

As described above, the sliding portion 161A extends from the contact surface 143 of the seal lip 141A to the region also covering the bumper 131A. On the other hand, the sliding portion 161A may be provided only in the region covering at least the contact surface 143 of the seal lip 141A. The contact surface 143 involves multiple meanings.

A first meaning of the contact surface 143 means the surface where when the column hole 12, the shaft 31, and the dust seal 101 align the axis A, the seal lip 141A contacts the shaft 31. At this time, both the two lips L11 and L12 may contact the shaft 31, or only one lip L11 may contact the shaft 31, depending on the tensional force of the seal lip 141A.

Taking a step into the analysis leads to the relationship between the outer diameter of the shaft 31 and the inner diameter of the seal lip 141A. A region having a smaller diameter than the outer diameter of the shaft 31 in the lip L11 (L12) of the seal lip 141A is referred to as a so-called interference. When the tensional force of the seal lip 141A is relatively strong, the entire interference is deformed so as to be crushed, and the deformed interference is wholly brought into contact with the shaft 31. On the other hand, when the tensional force of the seal lip 141A is relatively weak, only a portion of the interference is deformed so as to be crushed, and only a portion of the deformed interference is brought into contact with the shaft 31. The region where the lip L11 (L12) provided on the seal lip 141B contacts the shaft 31 in this manner corresponds to the first meaning of the contact surface 143.

Description will be made about a second meaning of the contact surface 143. When the shaft 31 eccentrically shifts, the bellows 121A bends in the eccentric direction to absorb the eccentricity of the shaft 31, as will be described later. However, since a compressive load is applied to the seal lip 141A in the eccentric direction, the seal lip 141A deforms the lips L11 and L12 in greater way. At this time, the region in which the seal lip 141A contacts the shaft 31 corresponds to the second meaning of the contract surface 143.

Further, the contact surface 143 also has a third meaning. The third meaning is the aforementioned interference. That is, it means a region having a smaller diameter than the outer diameter of the shaft 31 in the lip L11 (L12) of the seal lip 141A.

The multiple meanings of the contact surface 143 as described above also applies to the seal lip 141B provided on the second seal 151B exactly as it is. To arrange, the term contact surface 143 includes at least the following three meanings:

(a) a region in which the seal lip 141 contacts the shaft 31 having no eccentricity, (b) a region in which the seal lip 141 contacts the eccentric shaft 31, and (c) a region having a smaller diameter than the outer diameter of the shaft 31 in the seal lip 141. (a) is the first meaning, (b) is the second meaning, and (c) is the third meaning (interference).

The term contact surface 143 is multiple meanings in this manner. However, no matter which way the contact surface 143 is interpreted, the sliding portion 161 is provided as in the present embodiment so that the entire circumference of the lips L11, L12, and L21 of the seal lips 141 (141A and 141B) is covered with the sliding portion 161.

The coefficient of friction of the sliding portion 161 is important. The friction coefficient of the sliding portion 161 must be defined so as to maintain a state in which abnormal noise due to a stick-slip phenomenon which occurs between the sliding portion 161 and the rotating shaft 31 is not generated. The friction coefficient of polytetrafluoroethylene (PTFE) exemplified in the present embodiment is 0.24. Since the friction coefficient of a general rubber elastic material used for the bellows 121, the bumper 131, and the seal lip 141 integrally formed with the elastic ring 113 of the mounting portion 111 is 1.0 or more, for example, about 1.1 to 1.6, the friction coefficient of the sliding portion 161 becomes about ⅓ or less of that of the seal lip 141. The sliding portion 161 having such a relatively low friction coefficient enables abnormal noise to be prevented from occurring due to the stick-slip phenomenon which occurs between the rotating shaft 31 and the sliding portion 161. Thus, the sliding portion 161 of the present embodiment has a friction coefficient which does not generate the abnormal noise due to the stick-slip phenomenon between the rotating steering shaft 31 and the sliding portion 161.

2. ACTIONS AND EFFECTS

The dust seal 101 is attached by being press-fitted into the column hole 12 provided in the dashboard 11. The insertion (press-fitting) of the dust seal 101 into the column hole 12 is performed from the vehicle interior P side. When the flange 114 hits the dashboard 11, the dust seal 101 is positioned and fixed at its position. The shaft 31 provided on an unillustrated steering column is attached so as to penetrate the dust seal 101. Thus, the seal lips 141 (141A and 141B) bring the lips L11, L12, and L21 into contact with the outer peripheral surface of the shaft 31 to seal the gap 51 between the dashboard 11 and the shaft 31.

Eccentricity occurs in the shaft 31 due to the operation of the vehicle and the like. At this time, the dust seal 101 absorbs the eccentricity by deforming the bellows 121 (121A and 121B), and maintains the sealed state of the shaft 31 by the seal lips 141 (141A and 141B).

From the relationship that the dust seal 101 is required to have the function of sealing dust even under an excessively eccentric environment, the contact pressure against the shaft 31 is set to be relatively strong. Therefore, a local load (stress) occurs in the seal lip 141 which slides relatively between the seal lip 141 and the shaft 31. As a result, the seal lip 141 is unevenly worn, and abnormal noise called "squealing" is generated. The squeaking is abnormal noise due to the stick-slip phenomenon.

Possible parameters that affect such squeaking are the following three factors:

the natural frequency of the vicinity of the sliding portion,
the tensional force of the seal lip, and
the friction coefficient of the sliding portion.

The present embodiment focuses on the friction coefficient of the sliding portion among these factors, and attempts to suppress the generation of abnormal noise called squeaking from this aspect. That is, according to the present embodiment, the entire circumference of the lips L11, L12, and L21 included in the seal lips 141 (141A and 141B) is covered with the sliding portion 161, which makes the friction coefficient of the sliding portion with the shaft 31 relatively low. As a result, even when the steering not shown is turned, that is, when the shaft 31 rotates, it is possible to prevent the generation of the abnormal noise due to the stick-slip phenomenon.

As described above, from the relationship that the dust seal 101 is required to have the function of sealing dust even under an excessively eccentric environment, the contact pressure against the shaft 31 is set relatively strong. From such circumstances, it is difficult for those skilled in the art to imagine covering the lips L11, L12, and L21 of the seal lips 141 (141A and 141B) with a resin. This is because one thinks that the sealing effect will be impaired by the resin.

On the other hand, the inventors of the present application have confirmed that even if the lips L11, L12, and L21 of the seal lips 141 (141A and 141B) are covered with the resin-made sliding portions 161 (161A and 161B), sealing performance is not always impaired. For example, the sealing performance can be maintained by making each sliding portion 161 (161A, 161B) using polytetrafluoroethylene (PTFE) as material have a thickness of 1 mm or less.

The sliding portion 161 (161A, 161B) of the present embodiment is a resin-made ring inserted into the seal lip 141 (141A, 141B). Therefore, the sliding portion 161 (161A, 161B) can be easily provided on the seal lip 141 (141A, 141B) using an insert molding method.

3. MODIFICATIONS

When implementing, various modifications and changes are permitted.

Figure 2:
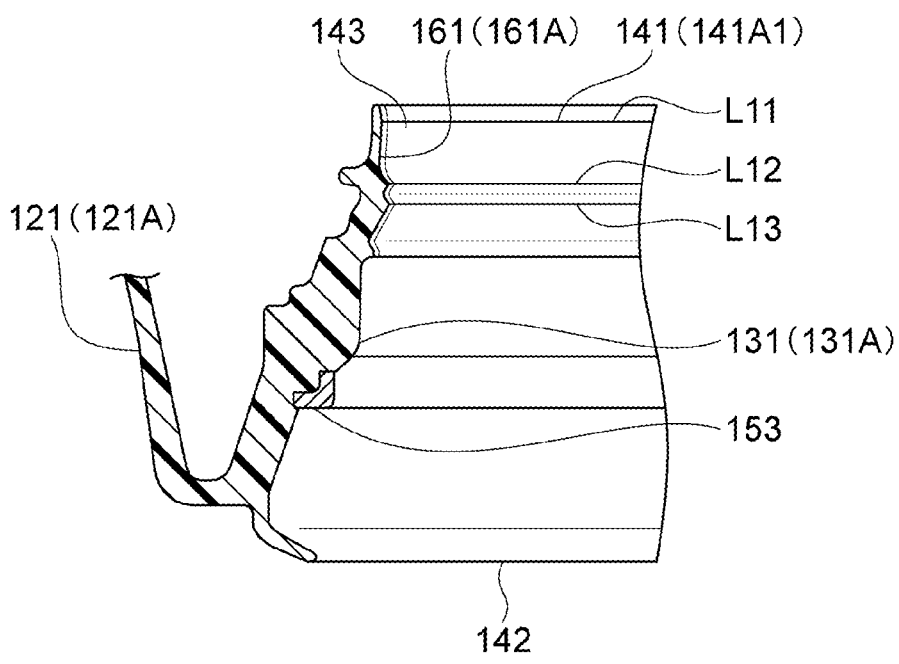
FIG. 2 is a cross-sectional view illustrating a modification with a seal lip enlarged.

For example, as illustrated in FIG. 2, in view of the seal lip 141A provided in the first seal 151A of the present embodiment, a sliding portion 161A covering lips L11 to L13 may be provided targeting a seal lip 141A1 having a relatively thin thickness. The seal lip 141A1 illustrated in FIG. 2 has the three lips L11 to L13, all of which are covered with the sliding portion 161A.

In the present embodiment, the example has been given in which the ring-shaped member (slider) is used as the sliding portion 161, but when implementing, it is not always necessary to use a member which maintains such a specific shape. The sliding portion 161 may be realized by a technique such as resin coating on the seal lips 141 (141A and 141B).

Any other modifications or changes are permitted.

DESCRIPTION OF REFERENCE NUMERALS

11 dashboard
12 column hole
31 steering shaft (shaft)
51 gap
101 steering dust seal (dust seal)
111 mounting portion
112 metal ring
113 elastic ring
114 flange
115 step
121, 121A, 121B bellows
131, 131A, 131B bumper
132 end surface
141, 141A, 141B, 141A1 seal lip
142 auxiliary lip
143 contact surface
151 seal
151A first seal
151B second seal
152 outer ring
153 inner ring
161, 161A, 161B sliding portion

The invention claimed is:

1. A steering dust seal for sealing a gap between a column hole provided in a dashboard that separates an engine room and a vehicle interior, and a steering shaft, the steering dust seal comprising:

an annular mounting portion configured to be attached to an inner peripheral surface of the column hole;

an annular bumper arranged radially inside the annular mounting portion and configured to face the steering shaft in a non-contact state;

an annular reinforcement ring provided at an inner surface of the annular bumper to reinforce the annular bumper and provided separately from the annular mounting portion;

a bellows connecting the annular mounting portion and the annular bumper;

a seal lip extending from the annular bumper in an axial direction of the annular mounting portion and having an engagement surface configured to engage the steering shaft; and a resin-made sliding portion that is made of polytetrafluoroethylene, wherein the resin-made sliding portion covers an entire circumference of the engagement surface of the seal lip, wherein a thickness of the resin-made sliding portion is 1 mm or less, wherein the resin-made sliding portion extends from the seal lip to the annular reinforcement ring, and wherein a friction coefficient of the resin-made sliding portion is ⅓ or less of a friction coefficient of the seal lip.

2. The steering dust seal according to claim 1, wherein the resin-made sliding portion is a resin ring and the seal lip comprises an elastic material.

3. A sealing device configured to seal a gap between a shaft hole and a shaft, the sealing device comprising:

an annular mounting portion configured to be attached to an inner peripheral surface of the shaft hole;

an annular bumper arranged radially inside the annular mounting portion and configured to face the shaft while leaving a gap;

an annular reinforcement ring provided at an inner surface of the annular bumper to reinforce the annular bumper and provided separately from the annular mounting portion;

a bellows connecting the annular mounting portion and the annular bumper;

a seal lip extending from the annular bumper in an axial direction of the annular mounting portion and having an engagement surface configured to engage the shaft; and a resin-made sliding portion that is made of polytetrafluoroethylene, wherein the resin-made sliding portion covers an entire circumference of the engagement surface of the seal lip, wherein a thickness of the resin-made sliding portion is 1 mm or less, wherein the resin-made sliding portion extends from the seal lip to the annular reinforcement ring, and wherein a friction coefficient of the resin-made sliding portion is ⅓ or less of a friction coefficient of the seal lip.

* * * * *